2,745,085

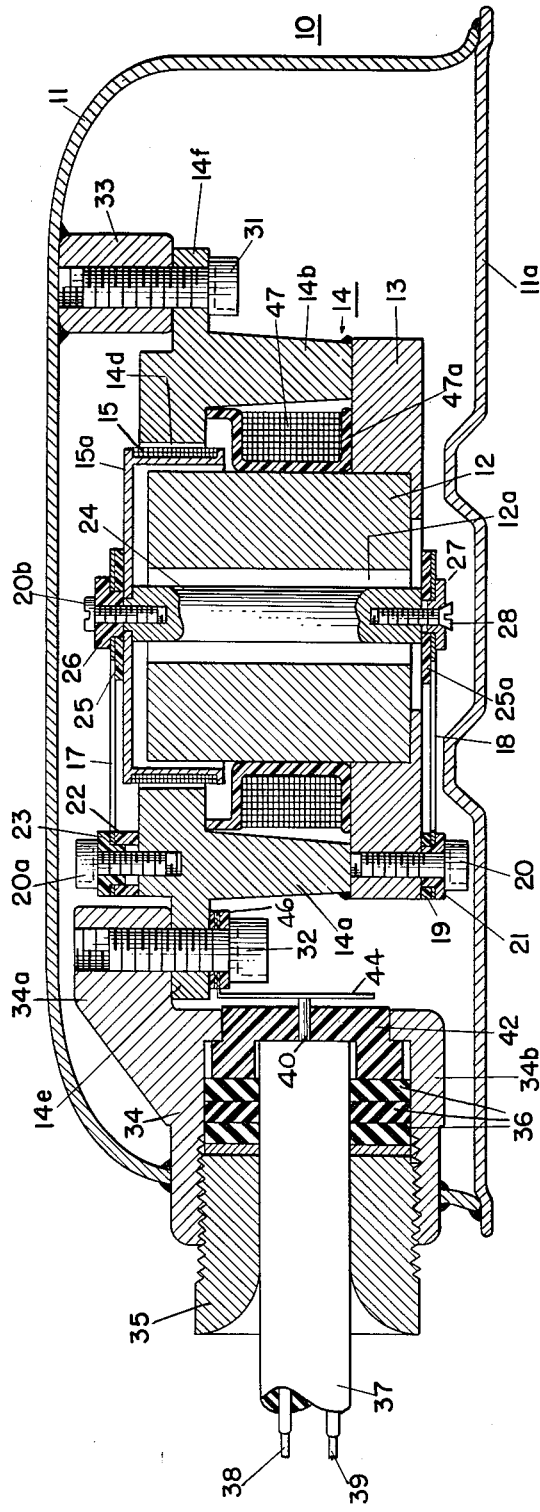

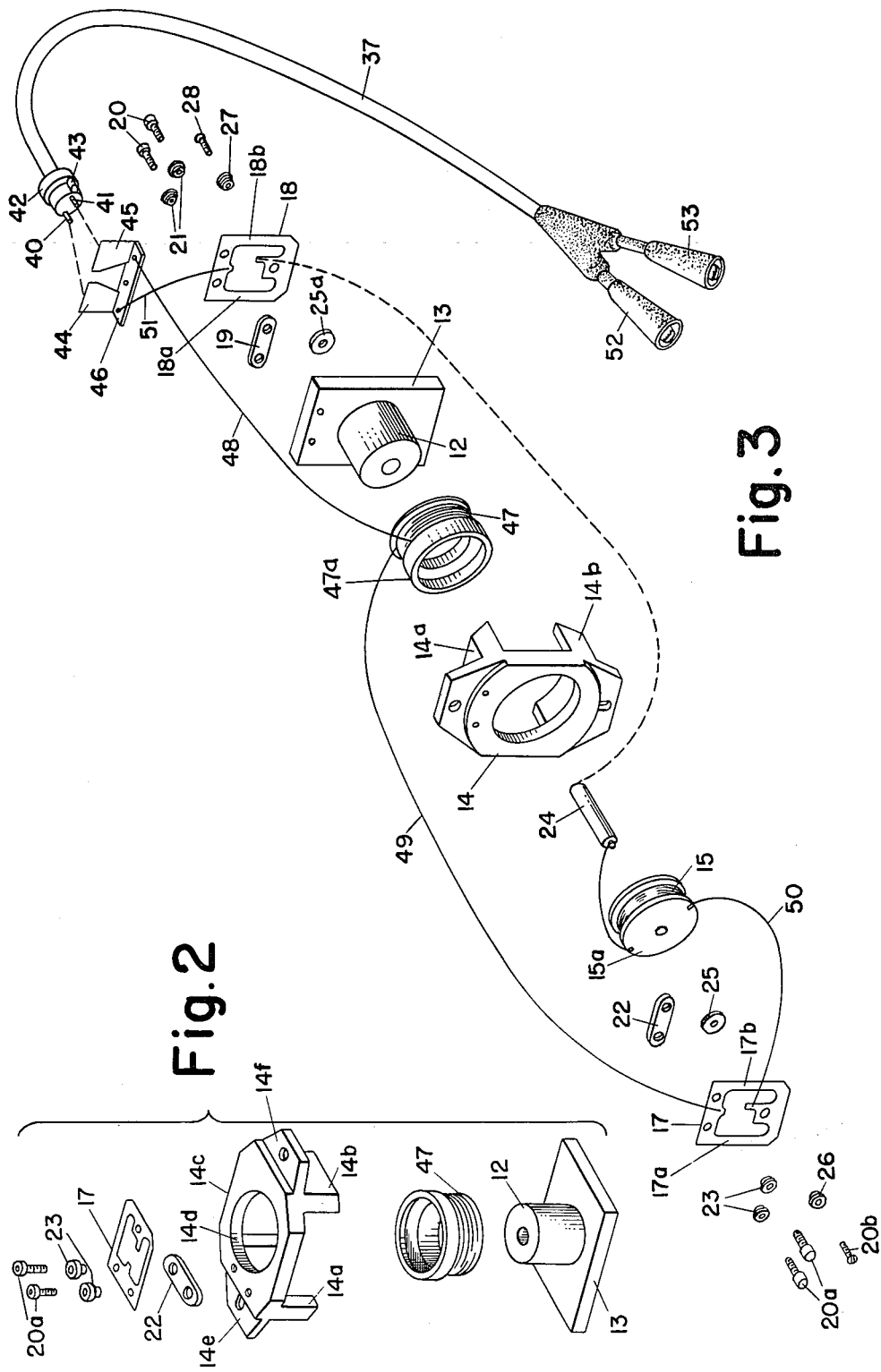

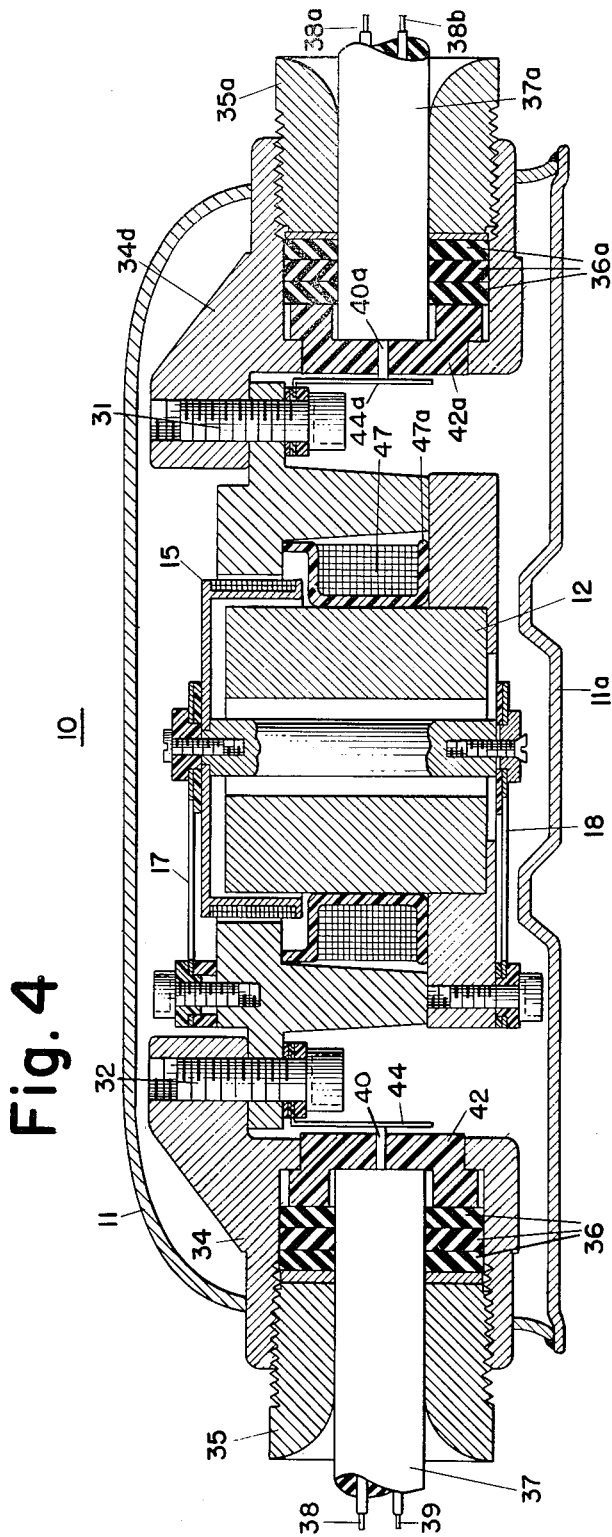
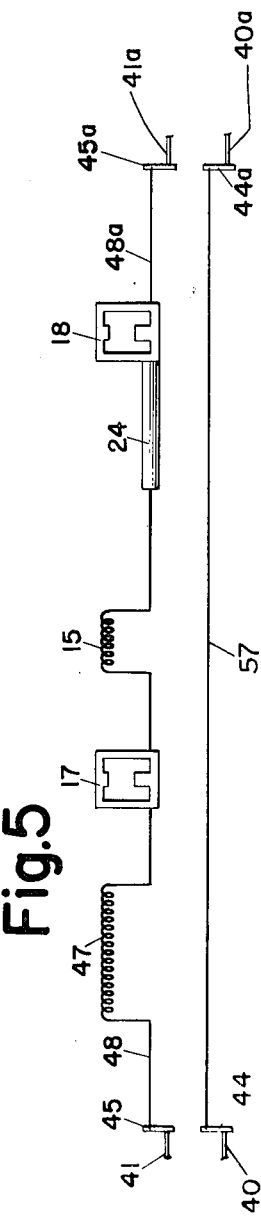
Fig. 4
Fig. 5

SEISMIC DETECTOR

Malcolm D. McCarty, Dallas, and Kenneth W. McLoad, Houston, Tex., assignors, by direct and mesne assignments, to Socony Mobil Oil Company, Inc., a corporation of New York Application July 9, 1953, Serial No. 366,888

5 Claims. (Cl. 340—17)

This invention relates to geophones or seismic wave detectors and has for an object the provision of a structure economical to manufacture, rugged in character, and of adequate sensitivity for detection of waves of low amplitude and free from the effects of stray magnetic fields.

Geophones or seismic detectors have long been used in exploration of the subsurface character of the earth and for vibration studies, and many different designs have been utilized. Nevertheless, much has been left to be desired in providing a geophone which lends itself to mass production, is of low cost, and yet whose performance is equal or superior to those of more expensive designs which have hitherto been utilized. When it is considered that it is frequently desirable to utilize hundreds of geophones in a single spread as compared to the conventional dozen or so, it will be apparent that the initial cost of the equipment becomes an important factor.

In carrying out the present invention in one form thereof, there is provided a geophone with at least equal or superior performance, one which lends itself to mass production with resultant low cost by reason of the elimination of all but a few machined surfaces and the utilization of a jig assembly method combined with electrical welding of the parts. The geophone is unusually compact, a feature desirable from the standpoint of cost, handling and storage.

More particularly, the geophone includes a cylindrical permanent magnet having an axial opening therethrough. To one end of the magnet there is jig-assembled and electrically welded a pole piece extending radially and outwardly from the permanent magnet. To the outwardly extending pole piece there are jig-assembled and welded pole pieces which at least partially circumferentially surround the cylindrical magnet and which at the opposite ends of that magnet terminate at a cross-member with a central opening coaxial of the permanent magnet and of somewhat larger diameter to form with respect thereto a circumferential air gap in which a resiliently supported coil is suspended. While the circumferential air gap is located at one end of the magnet by providing a member extending through the axial opening, resilient springs may be located on opposite sides of the magnet with both contributing to the elastic support of that member and the coil to provide improved performance characteristics.

Between the magnet and the outer pole pieces there may be located a stationary coil. At such location, the stationary coil is protected against mechanical damage and occupies a minimum of space. The stationary coil is provided as to have substantially the same induction as regards external varying magnetic fields as the resiliently mounted coil, and which when connected in series-opposition with the moving coil will balance out voltages induced by an external varying magnetic field or will reduce the difference to a sufficiently low value to insure a response of the geophone substantially solely to relative movement of the resiliently mounted coil in the magnetic field in which it is supported.

For further objects and advantages of the invention, reference is to be had to the following detailed description taken in conjunction with the accompanying drawings, in which:

Fig. 1 is a sectional view of a geophone embodying the invention;

Fig. 1-A is an end view of a plug connector;

Fig. 1-B is an end view of the plug-receiving socket;

Figs. 2 and 3 are exploded perspective views of certain of the parts of the geophone of Fig. 1;

Fig. 4 illustrates a modified construction particularly suited for series-connection of the geophones; and Fig. 5 diagrammatically illustrates one form of wiring of the geophone of Fig. 4.

Referring to the drawings, the invention in one form has been illustrated as comprising a geophone 10 mounted within a sealed housing 11, the bottom plate 11a soldered to the housing body. The housing 11 and plate 11a may be of magnetic material, such as steel, to provide a shielding against extraneous magnetic fields. The geophone itself comprises a cylindrical permanent magnet 12 provided with a centrally or axially extending bore or opening 12a. To the lower end of the magnet 12 there is welded a magnetizable pole piece 13 which may be of any suitable shape, such as rectangular, as illustrated in Figs. 2 and 3. It is preferably counter-bored to receive in close-fitting relationship the lower end of the cylindrical magnet 12. The pole piece 13 extends radially outward from the permanent magnet 12, and adjacent its outer extremities there is secured thereto as by electrical welding a member which includes legs or pole pieces 14a and 14b connected by a cross-member 14c adjacent the opposite or upper end of the permanent magnet 12. Thus there is provided a magnetic structure having substantially closed magnetic path for the flux from permanent magnet 12 extending from the lower end thereof by way of pole piece 13, legs 14a and 14b, the cross-member 14c, and thence from the inner surface 14d of a circular opening in said cross-piece to the upper end of the magnet 12.

The circular opening in cross-member 14c is of somewhat larger diameter than the permanent magnet to provide a fairly short but circumferential air gap in which is disposed a coil 15 made up of a plurality of turns carried by a non-magnetic form or spool 15a. As viewed in Fig. 1, surface 14d appears as the end of an inner flange, while outwardly extending ears or flanges 14e and 14f provide supports for the structure as a whole.

In order resiliently to support the coil within the circumferential air gap two sets of leaf springs 17 and 18 are provided, the lower spring 18 being secured as by cap screws 20 to the pole piece 13. Preferably, an insulating strip 19 and insulating washers 21 provide electrical insulation electrically to isolate the spring 18 from the magnetic structure 14. Similarly, an insulating strip 22 and insulating washers 23 insulate spring 17 from the magnetic structure 14 and cap screws 20a.

Each of the resilient supports of springs 17 and 18 is of rectangular shape, Figs. 2 and 3, with the central area removed to provide relatively narrow and flexible arms 17a, 17b and 18a, 18b, the thickness of the spring material and the dimensions of said arms establishing with said coil and associated supporting structure a natural resonant frequency of approximately 17 cycles per second. To the free and unsupported end of each of the cantilever springs 17 and 18 is secured a solid cylindrical member 24 of non-magnetic and preferably of electrically conductive material, such as copper. For reasons later explained, said member 24 at its upper end is preferably electrically insulated from spring 17 as by the insulating members 25 and 26 disposed between it and the fastening screw 20b. The lower spring 18, though pressed against an insulating washer 25a, is electrically connected to the central member 24 by a copper washer 27 and a brass fastening screw 28.

The magnetic structure 14 carrying the assembly thus far described is itself secured to bosses 33 and 34a by cap screws 31 and 32 extending through the ears or flanges 14e and 14f. The boss or supporting member 33 may be spot welded to the housing 11 with a threaded bore to receive the screw 31. The boss 34a, while it may be of the same welded construction as the boss 33, is shown as a part of an extension of a member 34 welded to the housing 11 and having a fairly large threaded opening to receive a threaded gland member 35 which, at its inner end, presses against a stack of sealing washers 36 and through which extends the electrical cable 37 carrying electrical conductors 38 and 39. Preferably, the conductors extend into terminal members 40 and 41 carried by an insulating plug or terminal member 42 having a positioning projection 43, Fig. 1-A, disposed for movement within a groove 34c provided at the inner end of the member 34. The insulating terminal member 42 is provided with a circumferential flange which bears against the inner face 34b of member 34.

The conductors 38 and 39 secured within terminal members 40 and 41 as by crimping or soldering respectively make electrical contact with resilient terminal members 44 and 45 carried by an insulating support 46.

Inasmuch as the amplitude of the signals may be relatively small, or stated differently, the sensitivity of the geophone may be required to be relatively high, the presence of any varying magnetic field may and frequently does induce electromotive forces within the coil 15 which appear mixed or blended with the seismic signals and at times mask the seismic signals entirely. To avoid the effects of such extraneous or stray magnetic fields, hum-bucking coils have heretofore been employed. In accordance with the present invention, the geophone or detector is made insensitive to stray magnetic fields by use of coils having substantially equal induction as to extraneous fields. One coil is located intermediate the ends of the magnetic structure and in a region in which, for other reasons, there must be provided a substantial air space. Thus, by locating the hum-bucking coil 47 in such intermediate and partly shielded location, the space requirements of the geophone are minimized. The coil 47, by reason of its location, is protected against damage by handling of the sub-assembly. The coil 47 is wound on an insulating support 47a whose upper end abuts the magnetic structure to space coil 47 below and away from coil 15. Preferably the coil 47 has a larger number of turns than the coil 15 in compensation for its shielded location. However an equal or smaller number of turns can be used to keep low the resistance of the circuit and still to a satisfactory degree balance the voltages due to varying stray magnetic fields. Coils 15 and 47 are connected in series-opposition so that when the geophone is subjected to an extraneous magnetic field, i. e., one not coming from permanent magnet 12, there is induced in the two coils 15 and 47 voltages whose instantaneous magnitudes are substantially equal. Since the coils are connected in series opposition, the instantaneous polarities of the induced voltages are opposed. Thus, the geophone is made satisfactorily free of the effects of stray magnetic fields.

The simplicity of construction thus far described lends itself to jig assembly and electric welding, greatly reducing the overall cost, and yet provides an instrument of ruggedness without detraction from its sensitivity and freedom from extraneous magnetic fields.

Further in accordance with the invention, the electrical circuits are completed with a minimum of conductors and connections, thus further reducing assembly operations, cost, and possibility of failure always present with a multiplicity of soldered or clamped electrical connections.

More particularly, and referring now to Fig. 3, the circuit through the geophone may be traced from terminal 41 by way of a conductor 48, the coil 47, conductor 49, to the spring 17. From spring 17 the circuit extends by way of conductor 50 and the coil 15 to the end of the copper central member 24, which, it will be recalled, is insulated from spring 17. From the opposite end of central member 24 the circuit is direct to the spring 18, as through screw 28 and washer 27, Fig. 1, and from spring 18 the electrical circuit is completed by way of conductor 51 to resilient contact 44 and the terminal member 40.

The conductors 38 and 39 of Fig. 1 may terminate at the opposite end of cable 37 in any suitable form of connectors for connecting the geophone 10 in series or in parallel with other geophones. As shown, shielded alligator clips 52 and 53 are provided.

Notwithstanding the fact that the casing is hermetically sealed as by the soldering of bottom plate 11a to housing 11, Fig. 1, and by the leak-proof seal around conductor 37, the assembly as a whole, including the cable 37 in proximity to the geophone, is preferably encased in vulcanized rubber.

In some locations, it may be desirable to connect a number of geophones in parallel, and in other locations it will be desirable to connect the geophones in series, and in still other locations various combinations of the two types of connections will be utilized. Where the geophones are to be connected in series, the contact assembly described in connection with Fig. 3 may be duplicated as illustrated in Fig. 4, and to which there have been applied like reference characters to corresponding parts.

With the double-ended construction of Fig. 4 a duplicate 34d of member 34 may be utilized at the right-hand end of the geophone with the other parts duplicated, namely, the gland member 35a for compressing the sealing washers 36a to form the leak-proof joint to prevent ingress of moisture in and around the plug 42a carrying the conductors. Terminal members 40a and 41a are disposed in abutting relationship with resilient contact members 44a and 45a, both appearing in Fig. 5. With the double-ended arrangement for the series connection of the geophones, it will be convenient to interconnect resilient contact members 44 and 44a by a conductor 57, the other connections of the geophone being shown in Fig. 5 as extending from terminal member 41 by way of contact 45, conductor 48, coil 47, spring support 17, the coil 15, the copper core member 24, resilient supporting member or spring 18, and by conductor 48a to contact 45a and terminal member 41a. Though not shown in the drawings, the double-ended geophone of Fig. 4 will likewise preferably be encased in rubber and vulcanized to the respective cables 37 and 37a to provide additional protection of the geophone, both from ingress of moisture and from injury due to abrasion and the like.

With either the geophone 10 of Fig. 1 or Fig. 4 placed upon the earth or upon any support subject to vibration, the geophone as a whole will be bodily moved by such vibrations. However, the resiliently supported mass comprising the central member 24, the coil 15 and its support 15a will tend to remain stationary. That mass, together with the resilience of the springs 17 and 18, is designed to be resonant at a frequency of about 17 cycles per second. Thus with vibrations applied of somewhat higher frequencies, there will be relative movement of the annular face 14d with respect to the coil 15. The resultant change of magnetic flux over the turns of the coil 15 will induce or generate a voltage of magnitude varying with the nature of the vibration.

As is well understood in the art, the signals from, or the voltages generated by, the geophone are applied by way of conductors 38 and 39 to suitable recording apparatus as, for example, an oscillograph. By varying the parameters of the resiliently supported mass as, for example, the thickness and cross-section of the springs 17 and 18 and the weight of the assembly as a whole, the natural resilient frequency may be raised or lowered.

Now that modifications of the invention have been described, it will be apparent that some features can be utilized without other features and that further changes can be made, all within the scope of the appended claims.

What is claimed is:

1. A detector having a magnet structure comprising a cylindrical permanent magnet, a radially extending pole piece counterbored to receive one end of said cylindrical magnet, a ring-shaped pole piece at the opposite end of said magnet forming therewith a narrow circumferential air gap and having legs extending lengthwise of said magnet into abutting engagement with said counterbored pole piece, mounting flanges forming an integral part of said structure and extending radially with respect to said cylindrical magnet beyond the periphery of said legs, and a housing to which said mounting flanges are secured.

2. The combination set forth in claim 1 in which there are provided cantilever springs at opposite ends of said magnet structure with the free ends thereof overlying said cylindrical magnet, said magnet having an opening centrally thereof, a non-magnetic metallic member extending through said opening and carried by the free ends of said cantilever springs, and a coil supported by said springs within said narrow air gap for generation of signals upon movement of said magnet structure relative to said coil.

3. A seismic detector having a magnet structure comprising a cylindrical permanent magnet, a first pole piece bonded to the end of said magnet, pole pieces extending parallel to said magnet and spaced therefrom and bonded to said first pole piece, a cross member interconnecting said last named pole pieces at the end of said magnet opposite said first pole piece and extending toward said magnet but spaced therefrom to form a circumferentially exposed air gap and extending away from said magnet to form mounting flanges which extend radially with respect to said magnet beyond said pole pieces, means secured to said flanges for holding said magnet structure in a fixed position relative to the surface of the earth, and means including a resiliently mounted coil on said magnet structure for sensing relative movement between said coil and the surface of the earth.

4. The combination set forth in claim 3 in which there are provided on opposite sides of said magnet structure a pair of resilient contacts spaced one from the other for completing electrical connections to said coils, and means associated with each such pair for holding electrical conductors against them for completing external electrical circuits thereto, whereby interconnection among a plurality of detectors is facilitated.

5. A detector having a magnet structure comprising a cylindrical permanent magnet with radially extending pole pieces and a central opening extending axially through said magnet, a ring-shaped pole piece at the opposite end of said magnet forming therewith a narrow circumferential air gap and having legs extending parallel to the axis of said magnet into abutting engagement with said pole piece, mounting flanges extending radially with respect to said cylindrical magnet beyond the periphery of said legs, a housing to which said mounting flanges are secured, cantilever springs at opposite ends of said magnet structure with the free ends thereof overlying said cylindrical magnet, a non-magnetic metallic member extending through said central opening and supported by said free ends of said springs, a coil supported by said springs within said narrow air gap, a humbucking coil disposed between said legs and said magnet, and means for connecting said cylindrically supported coil to said humbucking coil in series opposition.

References Cited in the file of this patent

UNITED STATES PATENTS

| | | |
|---|---|---|
| 2,348,225 | Petty | May 9, 1944 |
| 2,533,249 | Henson | Dec. 12, 1950 |
| 2,591,795 | Eisler | Apr. 8, 1952 |
| 2,623,938 | Thomas | Dec. 30, 1952 |
| 2,651,769 | Stafford | Sept. 8, 1953 |